United States Patent [19]

Flannaghan et al.

[11] Patent Number: 5,694,177
[45] Date of Patent: Dec. 2, 1997

[54] VIDEO SIGNAL FILTERING WITH TEMPORALLY SPACED SAMPLES IN TIME PAST

[75] Inventors: Barry Flannaghan, Winchester; Simon Auty; Martin Weston, both of Peterfield, all of Great Britain

[73] Assignee: Snell & Wilcox Limited, Petersfield, Great Britain

[21] Appl. No.: 537,666

[22] PCT Filed: Apr. 8, 1994

[86] PCT No.: PCT/GB94/00756

§ 371 Date: Oct. 6, 1995

§ 102(e) Date: Oct. 6, 1995

[87] PCT Pub. No.: WO94/24812

PCT Pub. Date: Oct. 27, 1994

[30] Foreign Application Priority Data

Apr. 8, 1993 [GB] United Kingdom ............ 9307433

[51] Int. Cl.$^6$ ................................... H04N 5/21
[52] U.S. Cl. .................... 348/607; 348/616; 348/620
[58] Field of Search ............................ 348/571, 607, 348/616, 620; 358/36, 37, 167, 166; 382/260, 262, 300; H04N 5/21, 5/213, 5/217

[56] References Cited

U.S. PATENT DOCUMENTS

| 4,737,850 | 4/1988 | Lu | 348/621 |
| 4,789,893 | 12/1988 | Weston | |
| 5,404,178 | 4/1995 | Kondo | 348/620 |

FOREIGN PATENT DOCUMENTS

| 0 266 079 | 10/1987 | European Pat. Off. |
| 0 475 499 | 3/1992 | European Pat. Off. |
| 2 173 971 | 10/1986 | United Kingdom |
| 2 202 706 | 9/1988 | United Kingdom |

*Primary Examiner*—Sherrie Hsia
*Attorney, Agent, or Firm*—Spencer & Frank

[57] ABSTRACT

A group delay of a noise-reducing median filter for video or a video FIR filter is reduced by transferring filter contributions of fields in "time forward" to fields in "time past" with respect to an output sample point. No significant impairment is introduced by this time asymmetry.

15 Claims, 6 Drawing Sheets

Fig. 4
Prior Art x INPUT LINES
o INTERPOLATED MISSING LINES
⊙ 'CURRENT' MISSING LINE

Fig.5 x  INPUT LINES o  INTERPOLATED MISSING LINES

⊙  'CURRENT' MISSING LINE

VIDEO SIGNAL FILTERING WITH TEMPORALLY SPACED SAMPLES IN TIME PAST

BACKGROUND OF THE INVENTION

This invention relates to video signal processing and more particularly to video signal filtering.

In one example, filtering of video signals is undertaken to reduce noise.

The use of a median filter, which selects the middle value from a number of inputs, is an established noise reduction technique in video signal processing. A typical median filter for this application has inputs corresponding to the centre sample, to horizontally adjacent samples on the same scan line and to vertically adjacent samples in the same horizontal position but on adjacent scan lines.

To achieve a higher level of noise reduction, particularly for low frequency noise, it has been proposed to add temporally adjacent samples. Thus, inputs for the median filter are taken from the same horizontal and vertical position in the immediately preceding and the immediately succeeding frames of the video signal. Inclusion of these points has the added benefit of reducing aliasing on still images, which is a known defect of two dimensional median filters. Motion between frames does not introduce blur since a median filter involves no feedback. Motion will usually result in the median filter selecting the centre sample or one of the spatially adjacent samples.

Whilst the extension of the median filter from two to three dimensions—that is to say the introduction of temporally spaced samples offers important advantages, it carries a penalty in terms of delay. To achieve the temporally spaced sample points, it is necessary to delay the "main" signal line containing the centre sample point and the spatially adjacent sample points, by one frame or (in 25 frames per second system) by 40 ms.

This delay can be a major drawback of median filter noise reduction techniques, since compensation will be required in the audio channels—and in cases where there is parallel processing of the video signal—in the other video channels. In contrast, recursive noise reduction techniques do not suffer from this delay, although they of course require efficient motion detection if motion blur is to be avoided.

Another example of video signal filtering is the decoding of composite television signals to separate luminance and chrominance information. A wide range of decoder circuits have been proposed to suit the differing demands posed by the numerous applications for decoders. These demands differ not only in the cost to performance relationship, but also in the behaviour of the filter; the design of a decoder is generally regarded as a compromise between competing criteria, the priority of which will differ from application to application.

The treatment of motion is an important aspect of the design of decoders, as with other video filters. Decoders have been produced which are motion adaptive in that they switch between modes of operation depending upon whether or not motion is detected. Non-adaptive decoders have also been produced in which the filter coefficients are selected such that reasonable performance is normally achieved irrespective of the presence of motion. A good example of a decoder in this category is disclosed in GB-B-2 173 971. This describes a PAL decoder using a total of nine contributions taken from five consecutive fields of the video signal. The performance of this decoder is generally regarded as very good and comparable with some alternatives which carry the additional costs of motion adaption. The described decoder does, however, require four field delays. This has the disadvantages described above in relation to noise reduction circuits.

Many more examples exist of video filters which offer good performance, compared for example with recursive or motion adaptive alternatives, but which rely on information being taken from the fields on either side of the reference point or, indeed two or more fields on either side. The difficulties that the presence of the necessary delays introduces in parallel audio or other video channels has hitherto been accepted as an inevitable consequence of achieving the desired filter performance.

SUMMARY OF THE INVENTION

It is an object of this invention to provide an improved filter which is nonrecursive, which operates in three dimensions and which avoids or reduces the problems of delay.

Accordingly, the present invention consists in one aspect in a filter for video signals having input samples spaced temporally and preferably also both horizontally and vertically from an output sample point, characterised in that the majority of temporally spaced samples are spaced in time past relative to the output sample point.

Advantageously, all temporally spaced samples are spaced in time past relative to the output sample point.

Suitably, the temporal spacing relative to the reference point of each and any sample temporally spaced in time forward is less than the temporal spacing relative to the output sample point of the earliest temporally spaced sample in time past.

In a further aspect, the present invention consists in a filter for video signals taking information from more than one point in time wherein the centre of gravity of the filter is earlier in time than the centre of the temporal aperture of the filter.

In yet a further aspect, the present invention consists in a video filter, wherein the group delay at a frequency of interest is less than one half of the width of the temporal aperture of the filter.

In still a further aspect, the present invention consists in a median filter for video signals, having input samples spaced horizontally, vertically and temporally from a centre sample, characterised in that the temporally spaced samples are all spaced in time past relative to the centre sample.

Advantageously, the temporally spaced samples consist of one or more samples from the same field in the preceding frame and one or more samples from the preceding field, corrected as appropriate for the line offset due to interlace.

Conveniently, the correction for line offset can be achieved by interpolating between two vertically adjacent samples to give the correct spatial position.

In another aspect, this invention consists in a method of reducing noise in a video signal by replacing a centre sample by the middle ranking member of a set of samples displaced horizontally, vertically and temporally about the centre sample, characterised in that the set of samples comprises at least two samples spaced horizontally from the centre sample in the same scan line, at least two samples from adjacent scan lines and at least two samples both spaced in time past from the centre sample.

BRIEF DESCRIPTION OF THE DRAWINGS

The invention will now be described by way of example with reference to the accompanying drawings in which.

DETAILED DESCRIPTION OF THE INVENTION

Figure 1:
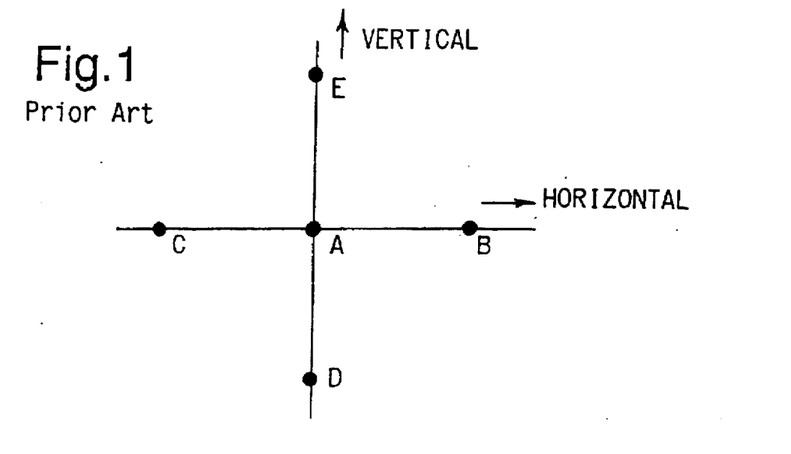
FIG. 1 is a diagram illustrating the operation of a known two dimensional median filter.

The median filter selects the middle value from a number of inputs. For noise reduction applications, these input samples are chosen for their high degree of similarity to the signal centre point. A typical two dimensional filter is shown in FIG. 1. Point (A) is the centre sample with points (B) and (C) being adjacent samples on the same scan line. Points (D) and (E) are in the same horizontal position as point (A) but are on adjacent scan lines.

Figure 2:
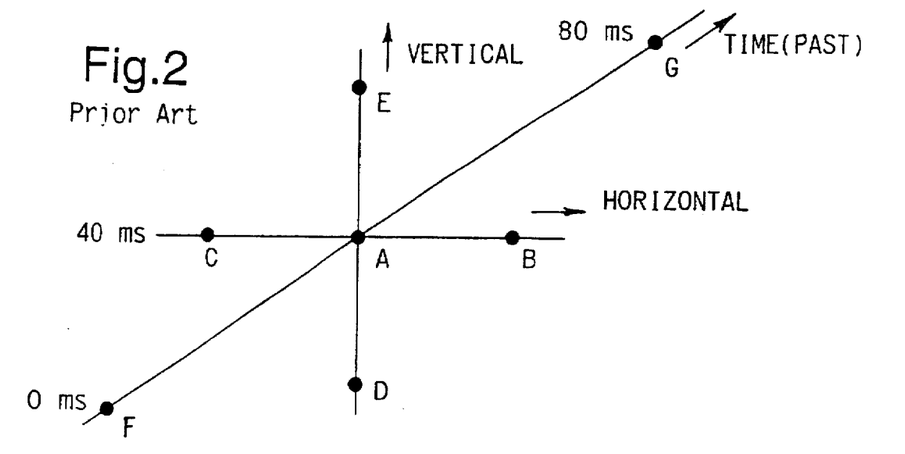
FIG. 2 is a diagram illustrating the operation of a known three dimensional median filter.

To achieve a higher level of noise reduction, particularly for low frequency noise, temporally adjacent samples are added to the median filter. This is shown in FIG. 2 where points (F) and (G) are in the same spatial position as point (A) but are from adjacent frames. As has been noted above, inclusion of these points has the benefit of reducing aliasing on still images. A major disadvantage of the arrangement of FIG. 2 is the need for a frame delay to enable selection of the point (F). To maintain synchronism, audio channels will require to be delayed by the same interval. Similarly, if the noise reduction filter is part of larger circuitry having parallel video processing channels, compensating delays will be required in those parallel channels.

Figure 3:
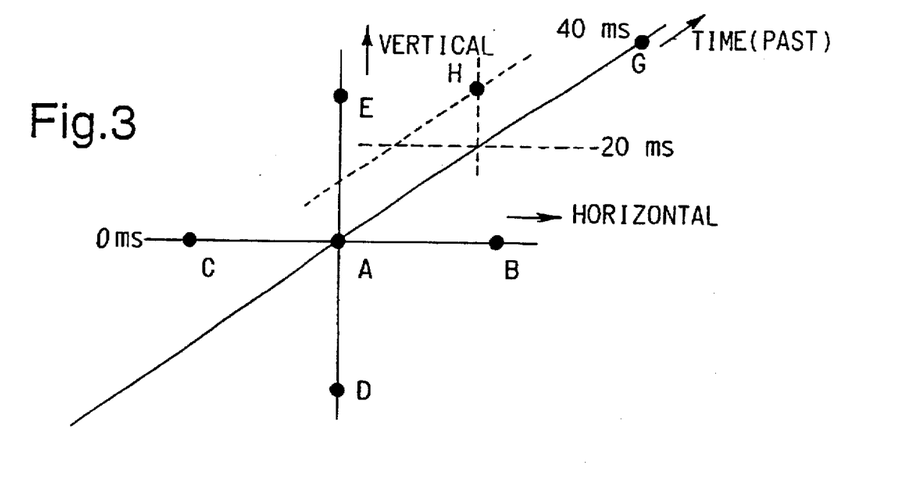
FIG. 3 is a diagram illustrating the operation of a filter according to the present invention.

It has unexpectedly been found by the present inventor that most of the advantages of a three dimension median filter can be preserved in an arrangement which lacks symmetry about the time axis and utilises two samples both spaced in time past from the centre sample. This enables a three dimensional median filter to operate without any substantial delay in the main signal path. Turning to FIG. 3, the point (F) spaced forwardly of the centre sample (A) is no longer required, so that points (A), (B), (C), (D) and (E) are taken from the field at time zero. Point (G) is retained, which is the same spatial location in the immediately past frame. Whilst it would in theory be possible to take an additional sample from a still earlier frame, it is preferred to take a fresh sample point (H) from the immediately preceding field. Because of interlace, it is of course necessary to correct for the line offset. Thus, in a 625 line 50 Hz standard, the sample point (H) may be interpolated from lines 312 and 313.

In the approach according to the invention, sample point (A) has an inherent delay of only one line, as compared to the delay associated with prior art three dimensional median filters of one frame.

In the instance where there may be colour sub-carrier on the video signal, the sample points should be chosen to provide an even as possible of phases. In practical terms, sample points (A), (E), (D) and (G) are fixed, whilst there exists the possibility of selecting the positions of samples (C) and (B) and the line from which sample (H) is taken, to choose the phase of the colour sub-carrier. Choosing samples so as to produce a distribution of phase will give some degree of sub-carrier rejection at the expense of inferior noise reduction. Choosing points with similar sub-carrier phases will preserve the noise reduction properties of the median filter but will not suppress or attenuate the sub-carrier. At high levels of sub-carrier, the noise reduction properties of the median filter are reduced.

Another important use of filters is in the interpolation of video lines. Interpolation may be conducted vertically, temporally or in a combined manner. A vertical interpolator has of course no difficulty in coping with movement but offers limited resolution. Combined or spatio-temporal interpolation will often offer the best performance. There is shown in GB-B-2 197 152 examples of spatio-temporal interpolators which are not motion adaptive. Care is taken to ensure that low vertical frequency components are taken substantially from the current field so that problems of movement blur are minimised. Higher vertical frequency components are taken from both the current field and the adjacent field, to improve vertical resolution.

Figure 4:
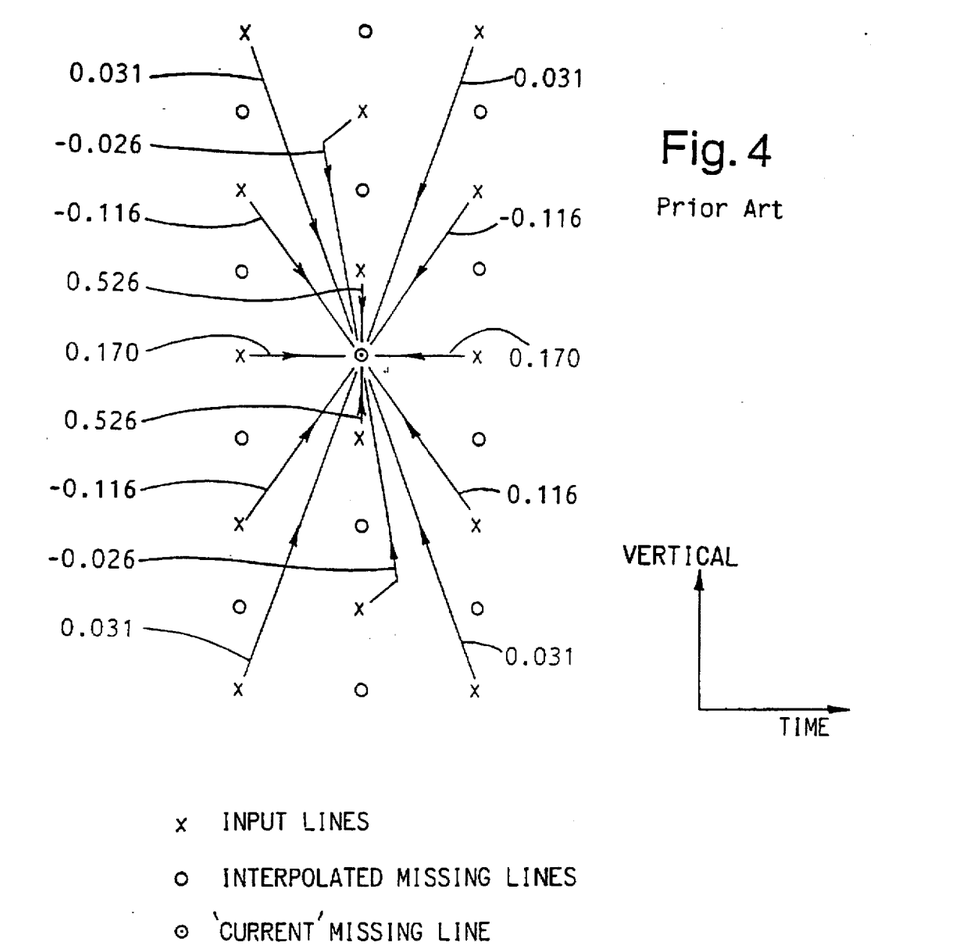
FIG. 4 is a diagram illustrating the operation of a known spatio-temporal interpolator.

Referring now to FIG. 4, there is shown in diagrammatic form the contributions taken from input lines x in an interlaced to sequential line converter. It will be seen that the contributions taken from the immediately preceding field, sum to zero, as do the contributions taken from the immediately succeeding field. The width of the temporal aperture, that is to say the interval in time between the earliest and latest sample points, is two fields.

Figure 5:
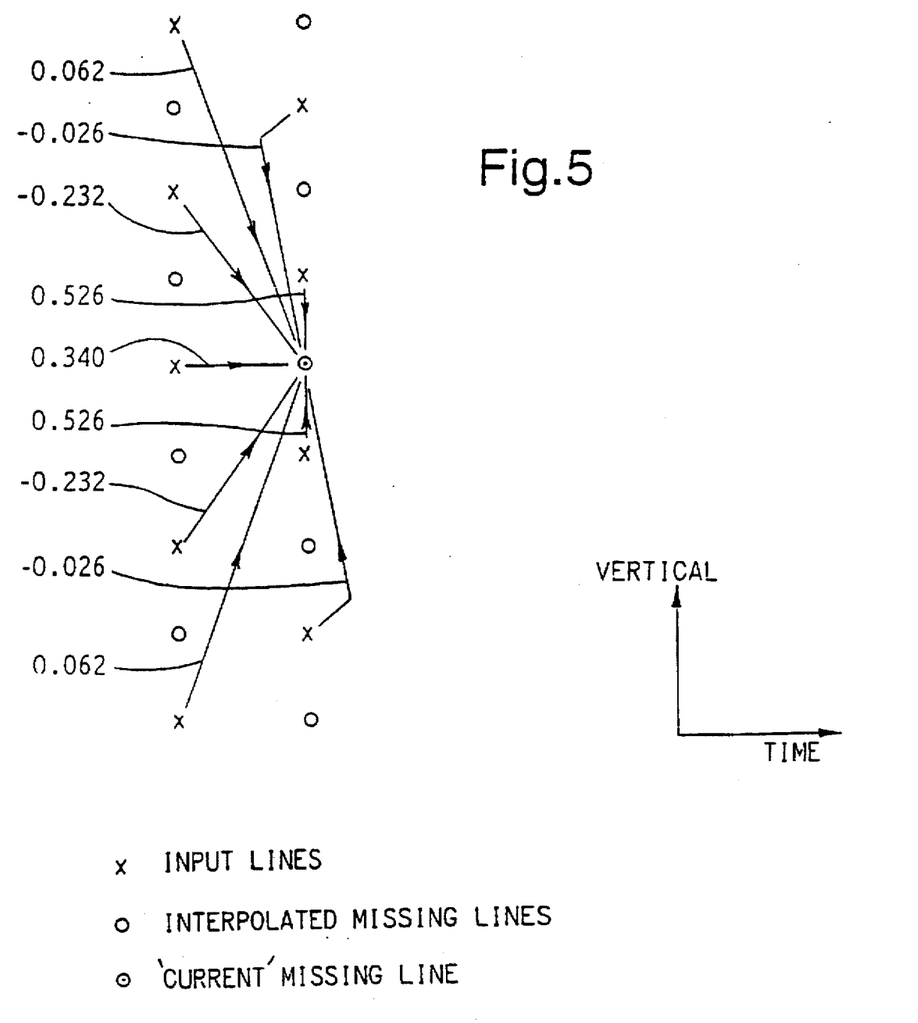
FIG. 5 is a diagram similar to FIG. 4, illustrating an interpolator according to the present invention.

In accordance with the present invention, this filter is modified; contributions from the current field are left unchanged whilst contributions from the immediately preceding field are replaced by equal contributions from the corresponding line in the immediately succeeding field. Thus, as shown in FIG. 5, the spatio-temporal interpolator according to the present invention requires no information from the field in "time forward" and takes a double contribution from the field in "time past". It is most surprisingly found that this modification—which of course removes the need for one field delay—provides a level of performance which remains satisfactory.

Figure 6:
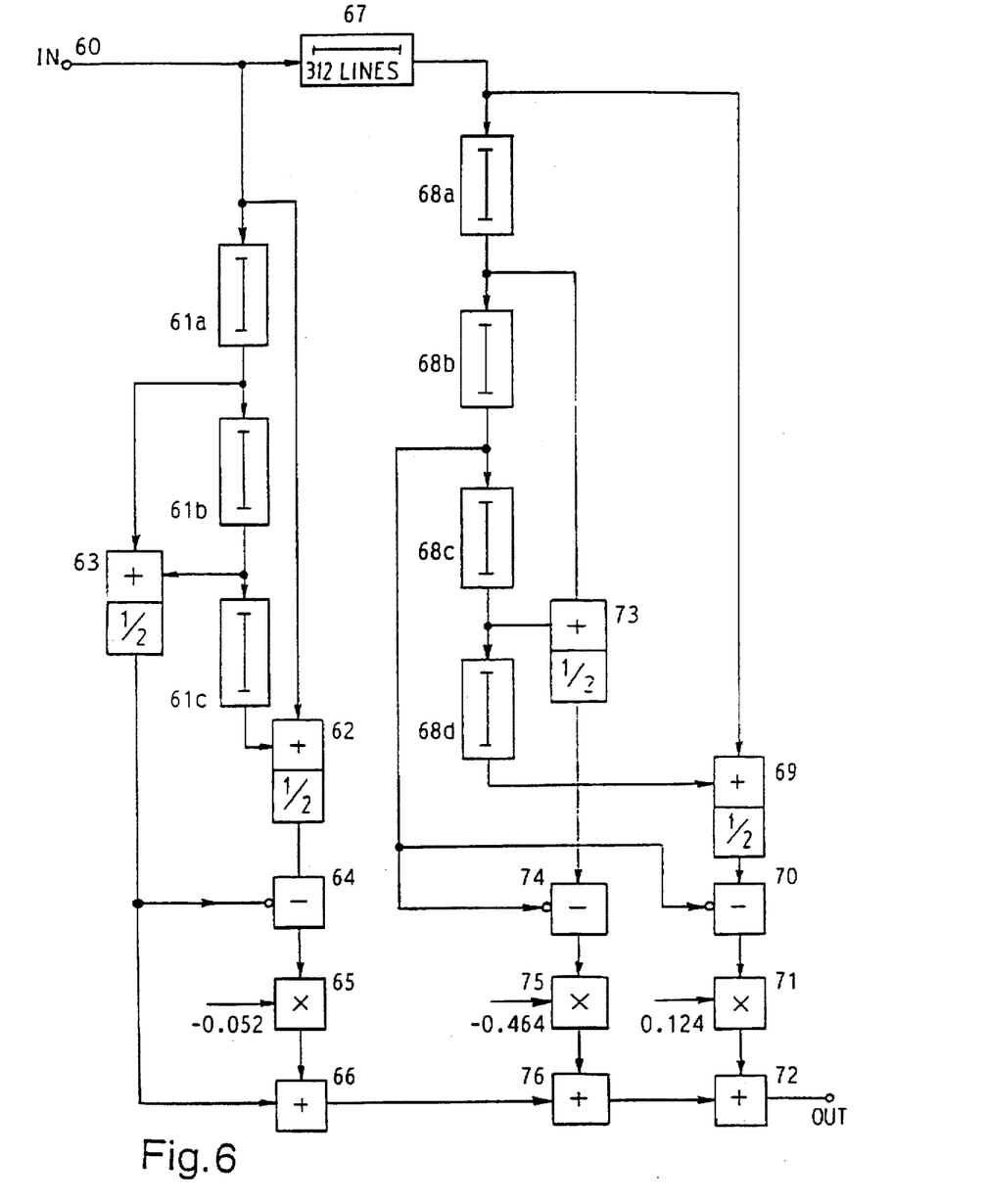
FIG. 6 is a block diagram of an interpolator according to the present invention, operating in accordance with FIG. 5.

A spatio-temporal interpolator operating in accordance with the approach of FIG. 5 is shown in FIG. 6. An input video signal at terminal 60 is taken through a chain of line delays 61a, 61b and 61c. The outermost taps from this delay chain are added and divided by two in block 62. The innermost taps are similarly summed and divided by two in block 63. The output from block 63 is subtracted from the output of block 62 in subtracter 64 and the result, scaled in multiplier 65, is added in block 66 to the output from block 63. This creates the desired contributions from the current line of:

$$-0.026 \quad +0.526 \quad +0.526 \quad -0.026$$

The video input signal is also taken through a field delay 67 (of 312 lines) feeding a chain of four line delays, 68a, 68b, 68c and 68d. The outermost taps from this delay chain are summed and divided by two in block 69. The centre tap is subtracted from the output of block 69 in subtracter 70 and the output, scaled in multiplier 71, passes to adder 72. The innermost taps of the delay chain are summed and divided by two in block 73. The centre tap is subtracted from the output of block 73 in subtracter 74 and the result, scaled in multiplier 75, is added in adder 76 to the output of the previously described contributions from the current field. The output of adder 76 forms the second input to adder 72 providing the output of the filter. It can be seen that this circuit produces contributions from fields in "time past" of:

+0.062  −0.232  +0.340  −0.232  +0.062

It is constructive to look in more detail at the delay of the described interpolater. The problem has already been mentioned of the need for matching delays in parallel audio—or indeed other video—channels. In this context, the delay that is relevant is the delay attaching to the critical picture information; here the low frequency signals. For a filter serving as a spatio-temporal interpolater, therefore, the frequency of interest when considering delay is low frequency. It is perhaps more proper to speak of the group delay of the filter at a frequency of interest, group delay being defined as the first derivative of phase with respect to frequency.

Returning to the specific case, the effect of the present invention has been to reduce the group delay at low frequencies by one field. It is also constructive to compare this group delay of the filter according to the invention with the width of the temporal filter aperture. The group delay can be seen to be two lines, at low frequency, in comparison to a temporal aperture width of one field. The delay is thus considerably less in ratio than that of the prior art filter having a group delay of over one half of the temporal filter aperture (315 lines compared to 625 lines). A group delay at the frequency of interest of less than one half of the width of the temporal aperture is a characteristic feature of filters according to a preferred form of the present invention.

Figure 7:
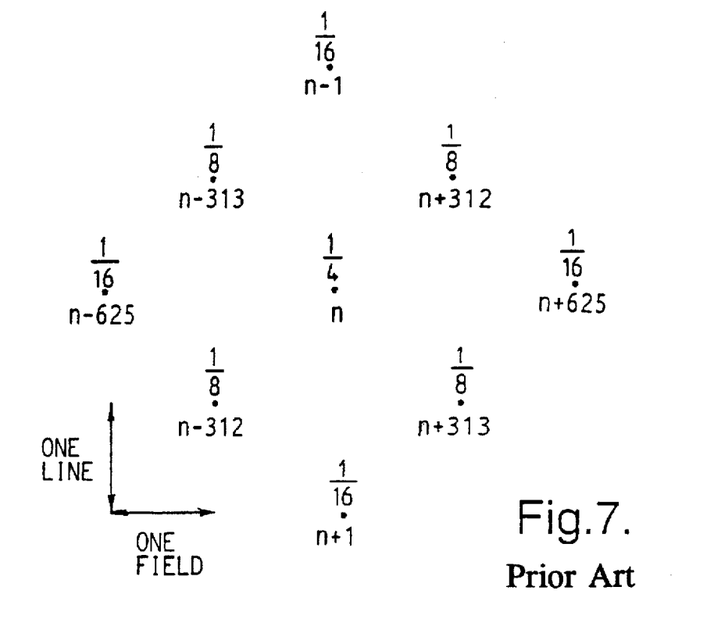
FIG. 7 is a diagram illustrating a known circuit for separating the luminance component of a PAL signal.

Turning to other filters, the important example has already been mentioned of the decoding of composite television signals. There is shown in FIG. 7 the operation of a known PAL decoder disclosed in GB-B-2 173 971. It will be seen that the decoder uses a total of nine contributions taken from five fields of the input composite signal. What is shown in FIG. 7 is in fact the luminance separating filter or comb.

Figure 8:
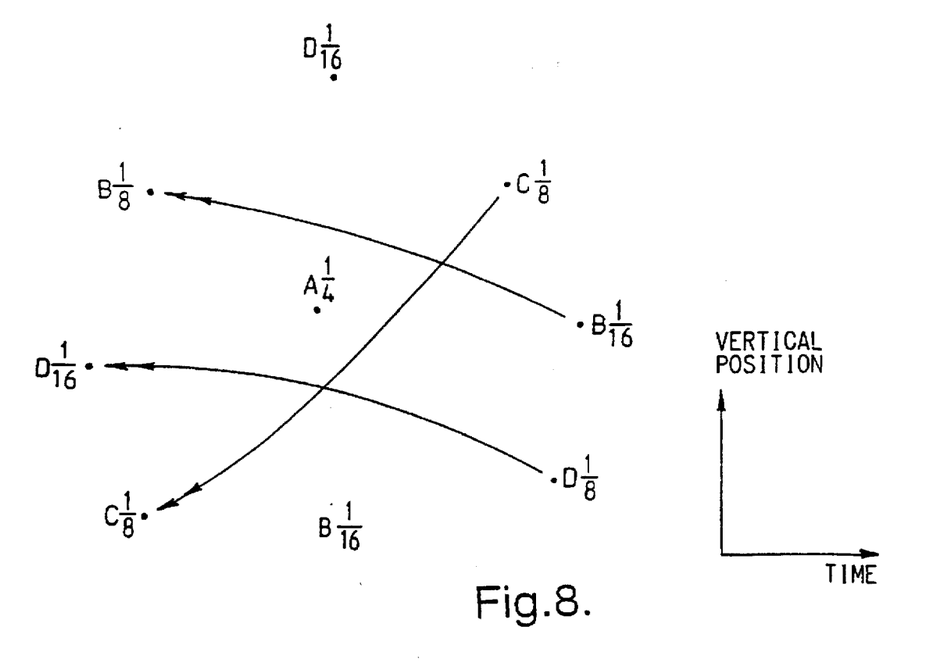
FIG. 8 illustrates the manner, in accordance with this invention, in which the filter of FIG. 7 can be adapted to reduce the inherent delay.
Figure 9:
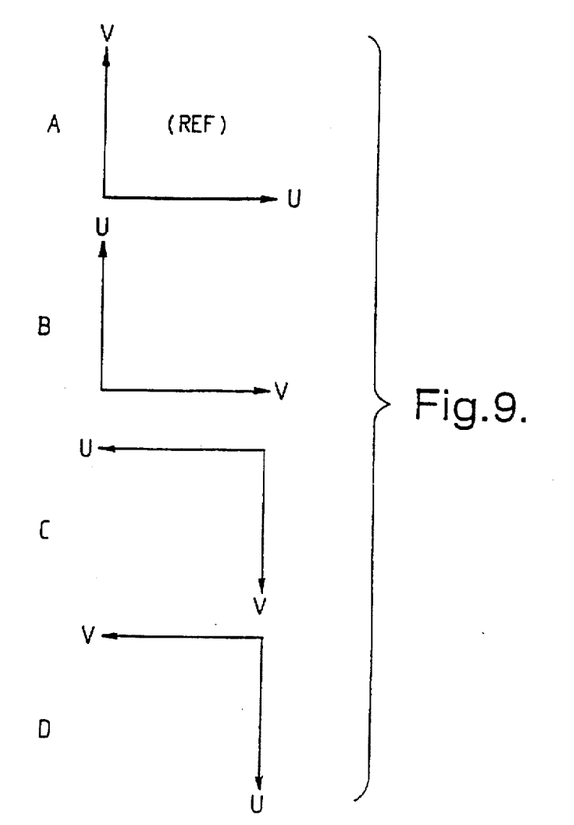
FIG. 9 is a series of plots illustrating the chrominance phases referred to in FIG. 8.

In accordance with the present invention, contributions from fields in "time forward" are replaced—as shown in FIG. 8—with additional contributions from fields in "time past". It is not appropriate simply to replace a contribution from a given line in a field in "time forward", with a contribution from the corresponding line in a field in "time past", because of the differing chrominance phases. It will be understood that the chrominance phases of the samples differ because of the relationship the chrominance subcarrier frequency and the line frequency. The different phases in FIG. 8 are identified with the letters (A), (B), (C) and (D) and the vector diagrams of FIG. 9 illustrate how these chrominance phases relate to the chrominance phase of the reference sample (A).

In order to maintain correct operation of the filter when transferring the contributions from future samples to past samples, it is necessary only to transfer contributions between sample positions having the same phase. This is illustrated by the arrows in FIG. 8.

A filter, to form part of a PAL decoder and operating in accordance with FIG. 8, will now be described with reference to FIG. 10. A PAL input signal is taken through a delay chain consisting of line delays 90 and 91, a 311 line delay 92, a line delay 93 and a 312 line delay 94. Multipliers 95A to 95F, having coefficients respectively of 1/16; 1/4; 1/16; 1/4; 3/16; and 3/16 are connected to the taps in the delay line and feed an adder 96 which derives the luminance output signal. It can be seen by inspection that this filter takes contributions as shown in FIG. 8 from the current field and two fields in "time past".

It may be advantageous to limit the frequency range of combing in known manner so that the filter only operates within the chrominance frequency band.

Figure 10:
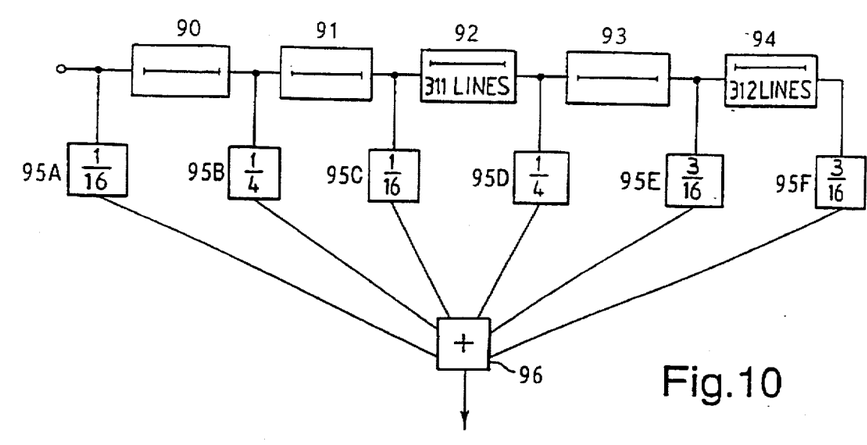
FIG. 10 is a block diagram of a circuit according to the present invention for separating the luminance component of a PAL signal.

It will be understood that the filter of FIG. 10, whilst being described as part of a PAL decoder, could also be employed as a luminance pre-filter to reduce cross-colour in a PAL encoder. More widely, a similar approach can be adapted with encoders and decoders in other standards.

It can be seen that, as compared with the known comb filter, the filter according to the present invention has been folded about an axis corresponding to the time of the output sample point. The time asymmetry thus created is surprisingly found to have no significant effect on the performance of the filter in an important range of applications.

This invention has been described by way of examples only and will find application in a wide range of filters for video signals beyond those specifically described. In many different applications, the technique according to this invention of transferring contributions from fields in "time forward" to fields in "time past" will provide valuable reductions in the group delay of non-recursive or finite impulse response (FIR) filters. More particularly, the present invention provides an FIR video filter having a group delay—at a frequency of interest—which is less than one half of the width of the temporal aperture of the filter. Looked at in a different way, the present invention provides a video filter having a centre of gravity which is earlier in time than the centre of the temporal aperture of the filter.

Whilst examples have been given of filters modified in accordance with this invention by the transfer of all contributions from fields in "time forward" to fields in "time past", it will be recognised that many of the advantages of this invention can be secured where the majority (but not necessarily all) the temporally spaced samples are spaced in "time past" relative to the sample point.

We claim:

1. A filter for video signals having input samples spaced temporally by respective fixed time intervals from an output sample point, wherein the majority of the temporally spaced samples are spaced in time past relative to the output sample point.

2. A filter as claimed in claim 1, wherein all temporally spaced samples are spaced in time past relative to the output sample point.

3. A filter according to claim 1 having a first input sample earliest temporally spaced in time past and, wherein the fixed time interval for any input sample temporally spaced in time forward is less than the fixed time interval for the first input sample.

4. A filter for video signals taking information from at least two points in time, said points being spaced one from the other by a fixed time interval, wherein a center of gravity of the filter is earlier in time than a center of a temporal aperture of the filter.

5. A filter according to claim 4, having a group delay at low frequency of less than one half of the temporal aperture of the filter.

6. A median filter for video signals, having input samples spaced horizontally, vertically and temporally by respective fixed intervals from an output sample point, wherein the temporally spaced samples are all spaced in time past relative to the output sample point.

7. A median filter according to claim 6, wherein the temporally spaced samples consist of one or more samples from the same field in an immediately preceding frame and a sample from an immediately preceding field.

8. A median filter according to claim 7, wherein the temporally samples are corrected for line offset due to interlace as appropriate.

9. A median filter according to claim 8, wherein the correction for line offset is achieved by interpolating between two vertically adjacent samples.

10. A method of adapting a finite impulse response video filter to reduce a group delay, comprising the steps of transferring a respective contribution from one or more sample points forward in time with respect to an output sample point to appropriate sample points in time past with respect to the output sample point.

11. A method according to claim 10, wherein the contribution is transferred from a sample point to a corresponding sample point one frame earlier.

12. A method according to claim 10, wherein the contribution is transferred from a sample point to a corresponding sample point one field earlier corrected as appropriate for line offset.

13. A method according to claim 10, wherein the contribution is transferred paying regard to a chrominance phase at the sample points.

14. A method according to claim 13, wherein the contribution is transferred to a sample point having the same chrominance phase.

15. A method of reducing noise in a video signal by replacing a center sample by a middle ranking member of a set of samples displaced horizontally, vertically and temporally about the center sample, wherein the set of samples comprises at least two samples spaced horizontally from the center sample in the same scan line, at least two samples from adjacent scan lines and at least two samples both spaced in "time past" from the center sample.

* * * * *